S. Stout.

Harness Hook.

No. 3,914. Reissued Apr. 12, 1870.

Witnesses;
H. C. Ashpetter
J. A. Frazer

Inventor;
S. Stout
per Munn & Co
attorneys

N. PETERS, PHOTO-LITHOGRAPHER, WASHINGTON, D. C.

United States Patent Office.

O. B. NORTH & CO., OF NEW HAVEN, CONNECTICUT, ASSIGNEES OF STEPHEN STOUT.

*Letters Patent No.* 78,154, *dated May* 19, 1868; *reissue No.* 3,914, *dated April* 12, 1870.

IMPROVED TRACE-HOLDER.

The Schedule referred to in these Letters Patent and making part of the same.

*To all whom it may concern:*

Be it known that STEPHEN STOUT, of Tremont, in the county of Tazewell and State of Illinois, has invented a new Improvement in Trace-holder for Harnesses; and we do hereby declare the following, when taken in connection with the accompanying drawings and the letters of reference marked thereon, to be a full, clear, and exact description of the same, and which said drawings constitute part of this specification, and represent in—

Figure 1:
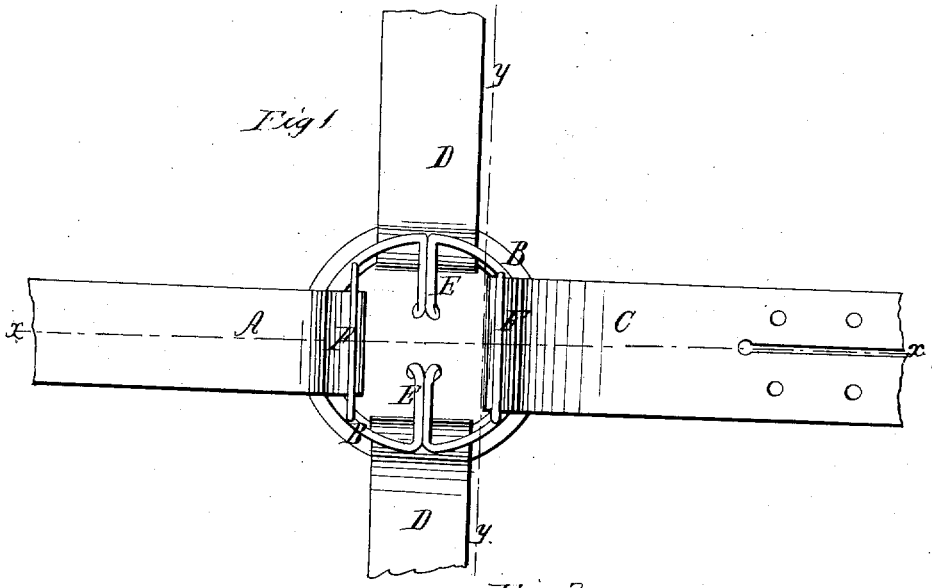

Figure 1, a top view of my improved trace-holder attached to a harness.

Figure 2:
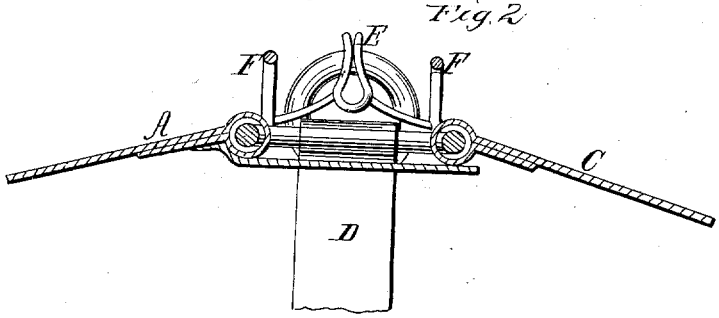

Figure 2, a longitudinal section of the same taken through the line *x x*, fig. 1.

Figure 3:
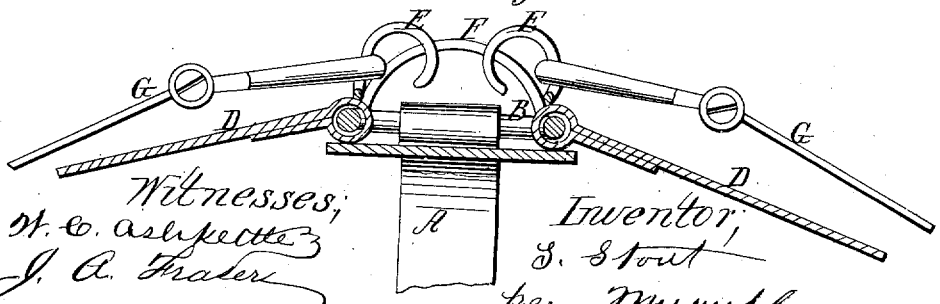

Figure 3, a cross-section of the same taken through the line *y y*, fig. 1.

This invention has for its object to furnish a neat, simple, and convenient device for attachment to the harness, upon which the traces may be hooked when detached from the whiffletree, so as to hold them securely and prevent their dropping down and being stepped upon by the horses, or being injured by tying them; and It consists in attaching to the harness, directly above the horse's hips, or at the point where the hip-straps are attached to the back-strap, a device so formed that the traces may be hooked upon it, and in the construction of the device for this purpose, as hereinafter more fully described.

A is a back-strap of the harness.

B is the ring, to which the rear end of the back-strap, the upper end of the strap C, to which the crupper is attached, and the upper ends of the hip-straps D are all attached.

To the ring B are attached, or upon it are formed two hooks E, in such a way as to form loops to allow the hip-straps D to be attached to the said ring B, as shown in figs. 1, 2, and 3.

F are loops or half circles attached to or formed upon the ring B upon both sides of the hooks E, to serve as guards to prevent the reins from catching upon the said hooks E.

When the traces G are detached from the whiffletree they are hooked upon the hooks E, as shown in figs. 2 and 3, by which they are securely held in place and prevented from dropping down to the ground and becoming soiled or being stepped upon by the horses.

It will be readily seen that a single guard-loop, instead of two, as shown, may be employed.

We claim as the invention of the said STEPHEN STOUT—

The ring or strap-connection B, having formed therein or made a part of the same a rein-guard and hook attachment for securing the traces, substantially as and for the purpose specified.

O. B. NORTH & CO.
By SAMUEL BRUCE, *Sec'y.*

Witnesses:
W. F. PARDEE,
EDWARD M. NORTH.